United States Patent
Juhue et al.

(12)

(10) Patent No.: US 6,518,380 B2
(45) Date of Patent: Feb. 11, 2003

(54) FLUOROCOPOLYMERS FOR THE HYDROPHOBIC AND OLEOPHOBIC TREATMENT OF VARIOUS SUBSTRATES

(75) Inventors: Didier Juhue, Vernon (FR); Martial Pabon, Courbevoie (FR); Denis Tembou N'Zudie, Serquigny (FR); Jean-Marc Corpart, Sannois (FR); Marie-Jose Lina, Lyons (FR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 93 days.

(21) Appl. No.: 09/729,228

(22) Filed: Dec. 5, 2000

(65) Prior Publication Data

US 2001/0020077 A1 Sep. 6, 2001

(30) Foreign Application Priority Data

Dec. 6, 1999 (FR) ............................................. 99 15321

(51) Int. Cl.[7] ........................ C08F 214/18; C08F 220/24
(52) U.S. Cl. ........................ 526/245; 526/263; 526/287; 526/310; 526/312
(58) Field of Search ................................. 526/243, 245, 526/248, 246, 263, 287, 310, 312; 428/422; 427/411, 408

(56) References Cited

U.S. PATENT DOCUMENTS

| 4,147,851 A |   | 4/1979 | Raynolds |
|---|---|---|---|
| 4,366,299 A |   | 12/1982 | Dessaint |
| 5,387,640 A |   | 2/1995 | Michels et al. |
| 5,439,998 A | * | 8/1995 | Lina ........................... 526/243 |
| 5,919,527 A | * | 7/1999 | Fitzgerald ................ 427/389.7 |

FOREIGN PATENT DOCUMENTS

| EP | 0 542 598 A1 | 5/1993 |
|---|---|---|
| EP | 0 554 667 A1 | 8/1993 |
| FR | 2 756 290 A1 | 5/1998 |
| WO | WO 97/39072 | 10/1997 |
| WO | WO 98/23657 | 6/1998 |
| WO | WO 99/65959 | 12/1999 |

OTHER PUBLICATIONS

French Search Report for FR99.15321 dated Jun. 6, 2000.

* cited by examiner

*Primary Examiner*—Fred Zitomer

(57) ABSTRACT

Fluorocopolymers resulting from the polymerization of a polyfluoromonomer, of an aminoalcohol (meth)acrylate and of methacrylic acid in a distillable organic solvent, and aqueous compositions containing them.

11 Claims, No Drawings

FLUOROCOPOLYMERS FOR THE HYDROPHOBIC AND OLEOPHOBIC TREATMENT OF VARIOUS SUBSTRATES

FIELD OF THE INVENTION

The subject of the present invention is novel fluorocopolymers and their use for the coating and the impregnation of various substrates, such as textiles, leather, wood, nonwovens, metal, concrete, stone and, more particularly, paper and similar articles, for the purpose of making them oleophobic and hydrophobic. The invention also relates to the substrates thus treated.

BACKGROUND OF THE INVENTION

To achieve this objective, many fluoroderivatives have already been proposed.

International Application WO 98/23657 thus teaches cationic fluorocopolymers capable of being obtained by the copolymerization of:

52 to 92% by weight of one or more polyfluoromonomers of general formula:

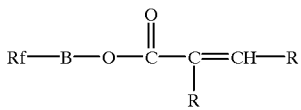

in which Rf represents a perfluorinated radical, having a straight or branched chain, containing 2 to 20 carbon atoms, preferably 4 to 16 carbon atoms, B represents a divalent linking which is linked to O by a carbon atom and which may comprise one or more oxygen, sulphur and/or nitrogen atoms, one of the symbols R represents a hydrogen atom and the other a hydrogen atom or an alkyl radical containing 1 to 4 carbon atoms;

1 to 25% of one or more monomers of general formula:

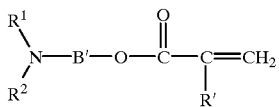

in which B' represents a linear or branched alkylene radical containing 1 to 4 carbon atoms, R' represents a hydrogen atom or an alkyl radical containing 1 to 4 carbon atoms, the symbols $R^1$ and $R^2$, which are identical or different, each represent a hydrogen atom, a linear or branched alkyl radical containing 1 to 18 carbon atoms or a hydroxyethyl or benzyl radical, or $R^1$ and $R^2$ together with the nitrogen atom to which they are linked form a morpholino, piperidino or pyrrolidin-1-yl radical;

1 to 25% of a vinyl derivative of general formula:

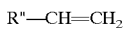

R"—CH=CH$_2$ in which R" may be an alkyl carboxylate or alkyl ether group containing from 1 to 18 carbon atoms.

The copolymerization reaction leading to the fluorocopolymers described by that international application is carried out in solution in a water-miscible organic solvent or solvent mixture and is followed by a step of dilution with an aqueous solution of a mineral or organic acid. This dilution step is carried out in the presence of hydrogen peroxide or is followed by a treatment by means of an aqueous hydrogen peroxide solution.

After the said dilution step, it is necessary to carry out a vacuum distillation or to flush with an inert gas, for example nitrogen, in order to remove the volatile compounds and to obtain a composition that can be sold and applied to the substrate to be treated.

The solvents exemplified in that application are, mostly, mixtures based on N-methylpyrrolidone. Because of their boiling point, these solvents are not completely removed by the distillation operation so that significant quantities of them remain in the commercial composition.

This commercial composition is thus in the form of a solution, thereby giving it stability properties which are highly advantageous for its transportation and its storage.

However, for some applications, and especially for the treatment of papers or similar articles intended for the field of packaging food products, it is desirable to reduce the amount of any solvents in commercial compositions, or even to completely eliminate them therefrom.

International Application WO 98/23657 mentions (cf. page 5 lines 14–15) that the use of light solvents makes it possible to obtain, after distillation, a commercial composition containing no organic solvent.

However, during the operation of distilling these light solvents, a gradual precipitation of the cationic fluorocopolymers occurs, which then results in an unstable aqueous dispersion, i.e. one which results in a settling in a few hours. Such a dispersion is unsuitable as a commercializable composition.

DETAILED DESCRIPTION OF THE INVENTION

It has now been found that the introduction of an anionic monomer, or a monomer which is potentially anionic by varying the pH, into the copolymers described by the international application, and a modification to their synthesis process, makes it possible to obtain novel fluorocopolymers which confer on various substrates, and especially on paper, the same hydrophobic and oleophobic properties and which, in addition, may be in the form of aqueous compositions which contain no organic solvents and are stable over time.

Fluorocopolymers according to the present invention are obtained by polymerization of a monomer mixture comprising by weight:

(a) from 50 to 92%, preferably from 70 to 90%, of one or more polyfluoromonomers of general formula:

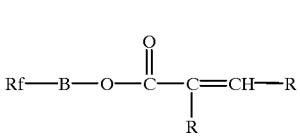

(I)

in which:

Rf represents a perfluorinated radical having a straight or branched chain, containing 2 to 20 carbon atoms, preferably 4 to 16 carbon atoms, B represents a divalent linking which is linked to O by a carbon atom and which may comprise one or more oxygen, sulphur and/or nitrogen atoms, one of the symbols R represents a hydrogen atom and the other a hydrogen atom or an alkyl radical containing 1 to 4 carbon atoms;

(b) from 1 to 25%, preferably from 8 to 18%, of one or more monomers of general formula:

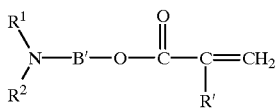

in which:
- B' represents a linear or branched alkylene radical containing 1 to 4 carbon atoms,
- R' represents a hydrogen atom or an alkyl radical containing 1 to 4 carbon atoms,
- the symbols $R^1$ and $R^2$, which are identical or different, each represent a hydrogen atom, a linear or branched alkyl radical containing 1 to 18 carbon atoms or a hydroxyethyl or benzyl radical, or $R^1$ and $R^2$ together with the nitrogen atom to which they are linked form a morpholino, piperidino or pyrrolidin-1-yl radical;
- (c) from 0.5 to 20%, preferably from 1 to 10%, of an anionic monomer or a monomer which is potentially anionic by varying the pH (III), such as alkene carboxylic acids, monoolefinic derivatives of sulphonic acid, and their salts of alkali or alkaline-earth metals;
- (d) from 2 to 10% of a vinyl derivative of general formula:

$$R''—CH=CH_2 \quad (IV)$$

in which R'' may be an alkyl carboxylate or alkyl ether group containing from 1 to 18 carbon atoms;
- (e) from 0 to 10%, preferably from 0 to 8%, of any monomer other than the monomers of formulae I, II, III and IV;

With regard to monomer (c), mention may be made especially of (meth)acrylic acid as an example of an alkene carboxylic acid and acrylamidomethyl-propanesulphonic acid as an example of a monoolefinic derivative of sulphonic acid.

The fluorocopolymers according to the present invention are prepared by copolymerization of the monomers in solution in a distillable organic solvent. The term "distillable" solvent is understood to mean any organic solvent or solvent mixture whose boiling point at atmospheric pressure is less than 150° C. Next, the reaction mixture is diluted with water in the presence of a mineral or organic acid in order to salify the macromolecules.

According to a preferred variant of the invention, this dilution step is carried out in the presence of hydrogen peroxide or is followed by a treatment by means of an aqueous hydrogen peroxide solution.

These fluorocopolymers can be applied to various substrates, such as leather, non-wovens, building materials, paper and board. In particular, they can be applied to paper using various techniques (applied in a size press or applied in the bulk), thus giving the paper, without the need for additives (sequestrants, retention agents, fixing resins, etc.), excellent hydrophobic and oleophobic properties.

According to the present invention, it is preferred to use:
(a) as polyfluoromonomers of formula I, the compounds of formula:

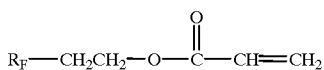

in which $R_F$ is a perfluoroalkyl radical containing 4 to 16 carbon atoms;

(b) dimethylaminoethyl methacrylate or N-tert-butylaminoethyl methacrylate as monomer of formula II;
(c) methacrylic acid as monomer of formula III; and
(d) vinyl acetate as monomer of formula IV.

As distillable organic solvent in which the copolymerization is carried out, mention may be made by way of non-limiting example of ketones (for example acetone or methyl ethyl ketone), of alcohols (for example isopropanol) and of ethers (for example THF or dioxane).

For implementing the invention, it is preferred to use, as solvent, methyl isobutyl ketone (MIBK) or methyl ethyl ketone (MEK) or a mixture of these with acetone.

The total concentration of monomers in the organic solvent or solvent mixture may range from 20 to 70% by weight and is preferably between 40 and 60%.

The copolymerization is carried out in the presence of at least one initiator, used in an amount from 0.1 to 2% with respect to the total weight of monomers. As initiators, it is possible to use peroxides such as benzoyl peroxide, lauroyl peroxide, succinyl peroxide and tert-butyl perpivalate, or azo compounds such as, for example, 2,2'-azobis (isobutyronitrile), 4,4,'-azobis(4-cyanopentanoic acid). The copolymerization step may be carried out at a temperature ranging from 40° C. up to the boiling point of the reaction mixture. It is preferably carried out at between 60 and 90° C.

The dilution step consists in adding an aqueous solution of a strong or moderately strong mineral or organic acid, that is to say an acid whose dissociation constant or whose first dissociation constant is greater than $10^{-5}$, to the organic solution of the copolymer.

As examples of such acids, mention may be made of hydrochloric, hydrobromic, sulphuric, nitric, phosphoric, acetic, formic, propionic and lactic acids, but it is preferred to use acetic acid. The amount of aqueous solution to be used and its acid concentration must be sufficient, on the one hand, to completely salify the amine functional groups provided by the monomer(s) of formula II and, on the other hand, to obtain a final copolymer solution having a solids content of between 5 and 30%, preferably between 20 and 30%. In order to completely salify the amine functional groups, the amount of acid is advantageously between 0 and 5 acid equivalents, preferably between 1 and 2 equivalents, with respect to the monomer(s) of formula II.

The amount of hydrogen peroxide used is between 0 and 10%, preferably between 0.5 and 4%, with respect to the total initial weight of monomers. The treatment is carried out at between 25 and 100° C., preferably at between 70 and 85° C.

The subject of the present invention is also the aqueous compositions comprising a fluorocopolymer as defined above. The said compositions are obtained by completing the process for manufacturing the fluorocopolymer as defined above with a distillation step, so as to remove any trace of organic synthesis solvent. The aqueous compositions obtained therefore do not have a flashpoint between 0 and 100° C. according to the ASTM D3828 standard. The distillation may be carried out at atmospheric pressure or reduced pressure. In general, these aqueous compositions are in the form of dispersions which are stable over time. Thus, these dispersions remain homogeneous and can therefore be transported and stored while still remaining capable of being used for the hydrophobic and oleophobic treatment of substrates. Advantageously, they are also water-dilutable.

The concentration of fluorocopolymer according to the invention in water is generally between 1 and 50%, preferably between 20 and 30%.

The subject of the present invention is also a solid substrate comprising at least one fluorocopolymer according to the invention, as defined above.

As substrates capable of being made oleophobic and hydrophobic with the products according to the invention, it is preferred to use paper, board and similar materials. It is also possible to use other highly varied materials such as, for example, woven or non-woven articles based on cellulose or regenerated cellulose, on natural, artificial or synthetic fibres such as cotton, cellulose acetate, wool, silk, polyamide, polyester, polyolefin, polyurethane or polyacrylonitrile fibres, leather, plastics, glass, wood, metals, porcelain and painted surfaces. It may also be advantageous to treat building materials such as concrete, stone, brick and tiles with the products according to the invention.

The aqueous compositions comprising a fluorocopolymer according to the invention are mainly applied diluted in an aqueous medium using known techniques, for example by coating, impregnation, immersion, spraying, brushing, padding or film-coating.

The products according to the invention can be applied in aqueous solution to paper, either onto the surface of the already completed substrate (preferably in an amount of 0.05 to 0.2% fluorine with respect to the weight of paper) or into the body of the material, that is to say into the paper pulp (preferably in an amount of 0.2 to 0.4% fluorine with respect to the weight of pulp).

The substrates thus treated exhibit good oleophobic and hyrophobic properties after simple drying at room temperature or at high temperature, optionally followed by a heat treatment which can range, depending on the nature of the substrate, up to 200° C.

To obtain good attachment of the fluorocopolymers according to the invention to the substrates to which they have been applied, and, in addition, to confer a specific effect, it is sometimes advantageous to combine them with certain additives, polymers, thermocondensable products and catalysts capable of promoting their crosslinking with the substrate. Mention may be made, as such, of urea-formaldehyde or melamine-formaldehyde condensates or precondensates, epoxy derivates, such as diglycidylglycerol, polyamine-epichlorohydrin resins, glyoxal and its derivates, polyvinyl alcohols and cationic, oxidized and amphoteric starches.

It may also be advantageous to combine the fluorocopolymers according to the invention with one or more non-ionic and/or cationic surfactants in order to improve the wetting of the substrate. The weight of this or these surfactants with respect to the total weight of copolymer may vary from 0 to 100%.

The surfactants may be added to the organic solution during the copolymerization reaction, during the dilution or to the aqueous composition obtained after distilling off the solvent. They may also be added at the time of application of the copolymers according to the invention.

The following tests were used to evaluate the performance of the treated substrates according to the invention:

EXAMPLES

Greaseproofness test or "kit value"

This test, described in TAPPI, Vol. 50, No. 10, pages 152A and 153A and in the RC338 and UM511 standards, makes it possible to measure the greaseproofness of substrates using mixtures of castor oil, toluene and heptane. These mixtures contain variable amounts of these three products:

| Kit Number (Kit Value) | Volume of castor oil | Volume of toluene | Volume of heptane |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

The test consists in gently depositing drops of these mixtures on the treated paper. The drops are left on the paper for 15 seconds and then the appearance of the paper or board is carefully observed and the wetting or penetration revealed by a browning of the surface is recorded. The number corresponding to the mixture containing the highest percentage of heptane, which does not penetrate or wet the paper, is the "kit value" of the paper and is regarded as being the degree of oleophobicity of the treated paper. The higher the "kit value", the better the oleophobicity of the paper.

Cobb Test

The Cobb test [NF EN 20535-ISO 535 (1994)] consists in measuring the weight (in g) of water absorbed during one minute by a square meter of paper supporting a water height of one centimeter.

Test of resistance to dry animal food 200 g of dry dog food, of the ROYAL CANIN (ST 35 grade) brand, are deposited on a 100 $cm^2$ area of treated paper in a controlled-environment oven at 60° C. and 65% relative humidity.

The assembly is placed on an untreated absorbent paper (filter paper type) of the same area. After this, a 3.5 kg weight is placed on the entire assembly, which is left in the oven for 3 days.

The diffusion of the fats is evaluated by measuring the total area of the stains which have appeared on the absorbent paper. It is considered that the barrier to the fats is effective when the stained area is less than 10% of the total area of the absorbent paper. This value is called the percentage soak-through.

Oleophobicity Test

The oleophobicity was measured on certain substrates using the method described in "AATCC Technical Manual", Test Method 118-1992, which evaluates the non-wettability of the substrate using a series of oily liquids numbered 1 to 8:

No. 1: liquid paraffin
No. 2: liquid paraffin/n-hexadecane (64/35)
No. 3: n-hexadecane
No. 4: n-tetradecane
No. 5: n-dodecane
No. 6: n-decane
No. 7: n-octane
No. 8: n-heptane.

The test consists in depositing drops of these mixtures on the treated substrates and then in observing the effect of the drop after 30 seconds of contact. The rating is given by the number of the last drop of liquid which has neither penetrated nor wetted the substrate.

Hydrophobicity Test

The method is adapted from the oleophobicity test. The test liquids numbered 1 to 10 are mixtures by weight of demineralized water and 2 propanol.

| Test liquid reference numbers | Composition by weight | |
|---|---|---|
| | Demineralized water | 2-Propanol |
| 1 | 90 | 10 |
| 2 | 80 | 20 |
| 3 | 70 | 30 |
| 4 | 60 | 40 |
| 5 | 50 | 50 |
| 6 | 40 | 60 |
| 7 | 30 | 70 |
| 8 | 20 | 80 |
| 9 | 10 | 90 |
| 10 | 0 | 100 |

The test consists in depositing drops of these mixtures on the treated substrates and then in observing the effect of the drop after 30 seconds of contact. The rating is given by the number of the last drop of liquid which has neither penetrated nor wetted the substrate.

The following examples illustrate the invention without limiting it. Unless otherwise mentioned, the parts indicated are parts by weight.

Example 1

A reactor of 600 parts by volume, fitted with a stirrer, a thermometer, a reflux condenser, a dropping funnel, a nitrogen inlet and a heater, is charged with 40 parts of MIBK, 2 parts of MEK, 27 parts of acetone, 16 parts of dimethylaminoethyl methacrylate, 8.8 parts of vinyl acetate, 1.2 parts of methacrylic acid, 81.4 parts of a mixture of fluoracrylates of formula:

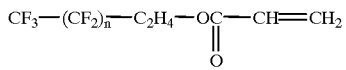

where n is equal to 5, 7, 9, 11 and 13 in mean and respective weight ratios of 1/63/25/9/3, and 0.4 part of 4,4'-azobis (4-cyanopentanoic acid).

The mixture is heated at 70° C. under a nitrogen atmosphere for 4.5 hours, then the temperature is raised to 78° C. 0.5 hours later, 0.32 part of 4,4'-azobis(4-cyanopentanoic acid) is added and the reactor is left at 78° C. for 3 hours.

Next, an aqueous solution comprising 290 parts of water, 8 parts of acetic acid and 2.5 parts of 35 wt % hydrogen peroxide is poured in at 70° C.

The mixture is held for two hours at 70° C. under a stream of nitrogen and then the solution is distilled at a reduced pressure so as to obtain a 25% solution of fluorocopolymer according to the invention.

The mixture is then cooled down to room temperature. 410 parts of an amber-coloured dispersion (S1) are thus obtained, this dispersion being completely stable over time.

This dispersion does not include an organic solvent and therefore does not have a flashpoint between 0 and 100° C. according to ASTM D3828 standard.

Comparative Example 1

The procedure is as in Example 1 but with the methacrylic acid being completely omitted and replaced, weight for weight, with vinyl acetate.

410 parts of an amber-coloured dispersion (Sc1) comprising a fluorocopolymer according to International Application WO 98/23657 are then obtained. This dispersion settles after a few hours.

Example 2

The procedure is as in Example 1 but with 1.8 parts of methacrylic acid being added to the detriment, weight by weight, of the vinyl acetate, i.e. 3 parts of methacrylic acid and 7 parts of vinyl acetate.

410 parts of a completely stable solvent-free amber-coloured dispersion (S2), containing 25% of fluorocopolymer according to the invention, are then obtained.

Comparative Example 2

The procedure is as in Example 2 but, on the one hand, with the MIBK/MEK/acetone solvent mixture being replaced with 90 parts of NMP and 10 parts of acetone and, on the other hand, with only 200 parts of water being used for the dilution.

410 parts of a very stable amber-coloured solution (Sc2) is then obtained, but this still contains an amount of NMP greater than 20%.

Example 3

The solutions (S1), (Sc1), (S2), and (Sc2) are used.

The size-press ponds described in the table below are prepared with these various constituents.

| Constituents of the pond (g/l) | Pond number | | | |
|---|---|---|---|---|
| | 1 | 2 | 3 | 4 |
| Solution S1 | 15 | | | |
| Solution Sc1 | | 15 | | |
| Solution S2 | | | 15 | |
| Solution Sc2 | | | | 15 |
| Water | 985 | 985 | 985 | 985 |
| Total | 1000 | 1000 | 1000 | 1000 |

The pH of the ponds is set to 6.5. The various compositions are applied in a size press to a 70 g/m² paper composed of unsized bleached pulp. The degree of absorption of the pond by the paper (known in the art by the name "degree of application") is about 80%. After drying for one minute at 120° C., the paper thus treated is stored for 1 day at room temperature and then subjected to the various tests.

The results obtained are combined in the following table:

| Tests | Paper treated with pond No. | | | | Untreated paper |
|---|---|---|---|---|---|
| | 1 | 2 | 3 | 4 | |
| Kit value | 12 | 10 | 11 | 12 | 0 |
| Cobb (g/m²) | 19 | 20 | 19 | 21 | >100 |
| Soak-through (%) | 0 | 100 | 0 | 0 | 100 |

Comparing the results obtained on papers 1 and 3 on the one hand and paper 4 on the other, shows that the performance of the fluorocopolymers in the form of aqueous compositions, according to the invention, are comparable to those of the fluorocopolymers of International Application WO 98/23657 in the form of a solution containing an organic solvent.

In addition, comparing the results obtained on papers 1 and 3 on the one hand and paper 2 on the other, shows that introducing methacrylic acid as monomer makes it possible to achieve a substantially improved grease barrier effect.

Example 4

Solutions (S1) and (Sc2) are also used.

20 g of deciduous bleached kraft pulp, refined to 25° SR, are dispersed in 2.4 l of water for 45 minutes, the pH being adjusted to 6.5 with $H_2SO_4$. Next, 0.6 g of solution is added to this preparation, while stirring. All this is separated into 9 fractions of 270 g. Each fraction is diluted with 2 l of water, while stirring, in a bowl of a FRANK apparatus and filtered under vacuum in order to obtain a handsheet. Finally, the handsheet is dried under vacuum for 5 minutes at 90° C. on the plates of the FRANK apparatus. The characteristics of the paper sheets thus bult-treated with each solution are given in the table below:

|  | Handsheet made from pulp example | | Untreated |
|---|---|---|---|
| Tests | S1 | Sc2 | handsheet |
| Kit value | 12 | 12 | 0 |
| Cobb (g/m²) | 19 | 20 | >100 |

Comparing the results obtained on the handsheets made from pulps S1 and Sc2 shows that the performance of the fluorocopolymer in the form of an aqueous composition, according to the invention, is comparable to that of the fluorocopolymer of International Application WO 98/23657 in the form of a solution containing an organic solvent.

Example 5

Solutions (S1) and (Sc2) are also used. Each solution is diluted with water, at room temperature, so as to obtain an aqueous solution containing 2% fluorocopolymer.

This solution is then sprayed in the form of a cross onto specimens of lambskin leather using a Volumair T21 sprayer. The amount deposited is on average 150 g/m². After drying for 24 hours at room temperature, the leathers are tested.

Their characteristics are given in the table below:

|  | Lambskin treated with | | |
|---|---|---|---|
| Tests | (S1) | (Sc2) | Control |
| Oleophobicity test | 4 | 4 | 0 |
| Hydrophobicity test | 8 | 5 | 0 |

This table shows the remarkable effectiveness of the products for giving leather good water-repellency and oil-repellency properties. The fluorocopolymer according to the invention in the form of an aqueous dispersion (S1) has superior properties to the fluorocopolymer of Application WO 98/23657 in the form of a solution (Sc2) containing an organic solvent.

Example 6

The procedure is exactly as in Example 5 for treating a polyamide fabric with (S1).

The results are expressed in the following table:

|  | Polyamide treated with | |
|---|---|---|
| Tests | (S1) | Control |
| Oleophobicity test | 4 | 0 |
| Hydrophobicity test | 8 | 0 |

This table shows the remarkable effectiveness of the product to provide water-repellency and oil-repellency properties on a textile.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing reference is hereby incorporated by reference.

What is claimed is:

1. Fluorocopolymers obtained by polymerization of a monomer mixture comprising:
   (a) from 50 to 92% by weight, of at least one polyfluoromonomer of formula:

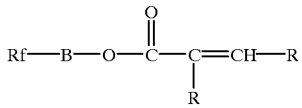

(I)

in which
   Rf represents a perfluorinated radical having a straight or branched chain, containing 2 to 20 carbon atoms,
   B represents a divalent linking which is linked to O by a carbon atom and comprises at least one oxygen, sulphur and/or nitrogen atom, and
   one of the symbols R represents a hydrogen atom and the other a hydrogen atom or an alkyl radical containing 1 to 4 carbon atoms;
   (b) from 1 to 25% by weight, of at least one monomer of formula:

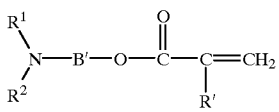

(II)

in which
   B' represents a linear or branched alkylene radical containing 1 to 4 carbon atoms,
   R' represents a hydrogen atom or an alkyl radical containing 1 to 4 carbon atoms, and
   the symbols $R^1$ and $R^2$, which are identical or different, each represent a hydrogen atom, a linear or branched alkyl radical containing 1 to 18 carbon atoms or a hydroxyethyl or benzyl radical, or $R^1$ and $R^2$ together with the nitrogen atom to which they are linked form a morpholino, piperidino or pyrrolidin-1-yl radical;

(c) from 0.5 to 20%, by weight of a monoolefinic compound of sulphonic acid, or an alkali or alkaline-earth metal salt thereof;

(d) from 2 to 10% by weight of a vinyl compound of formula:

in which R" is an alkyl carboxylate or alkyl ether group containing from 1 to 18 atoms; and (e) from 0 to 10% by weight, of any monomer other than the monomers of formulae I, II, and IV, and a compound of component (c);

the said copolymerization comprising:
the dissolving of the monomers in a distillable organic solvent; and
then the diluting of the reaction mixture with water in the presence of a mineral or organic acid to salify the macromolecules.

2. Fluorocopolymers according to claim 1, wherein the diluting with water is carried out in the presence of hydrogen peroxide or is followed by a treatment by an aqueous hydrogen peroxide solution.

3. Fluorocopolymers according to claim 1 wherein the following are used:

(a) as polyfluoromonomers of formula I, the compounds of formula:

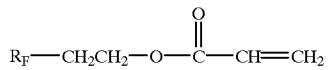

in which Rf is a perfluoroalkyl radical containing 4 to 16 carbon atoms;

(b) dimethylaminoethyl methacrylate or N-tert-butylaminoethyl methacrylate as monomer of formula II;

(c) acrylamidomethylpropanesulfonic acid as the compound of sulfonic acid; and (d) vinyl acetate as monomer of formula IV.

4. Fluorocopolymers according to claim 1, wherein methyl isobutyl ketone (MIBK) or methyl ethyl ketone (MEK), or a mixture of these with acetone, is used as the organic solvent.

5. Fluorocopolymers according to claim 2 wherein the amount of hydrogen peroxide used is between 0 and 10% by weight, for the total initial weight of monomers.

6. Aqueous compositions comprising from 1 to 50% by weight of a fluorocopolymer as defined in claim 1.

7. Solid substrate comprising at least one fluorocopolymer as defined in claim 1.

8. Solid substrate according to claim 7, wherein it is paper or board.

9. Fluorocopolymers according to claim 1, wherein the amount of polyfluoromonomers (I) is from 70 to 90% by weight, Rf contains from 4 to 16 carbon atoms, the amount of monomers (II) is from 8 to 18% by weight, the amount of compounds of (c) is from 1 to 10% by weight, and the amount of monomers of (e) is from 0 to 8% by weight.

10. Fluorocopolymers according to claim 5, wherein the amount of hydrogen peroxide is between 0.5 and 4% by weight.

11. Aqueous compositions according to claim 6, wherein the amount of fluorocopolymer is from 20 to 30% by weight.

* * * * *